United States Patent [19]

Spence et al.

[11] Patent Number: 5,324,544
[45] Date of Patent: Jun. 28, 1994

[54] INHIBITING COKE FORMATION BY COATING GAS TURBINE ELEMENTS WITH ALUMINA-SILICA SOL GEL

[75] Inventors: Jarrett L. Spence, Jupiter; Robert J. Wright, Tequesta, both of Fla.

[73] Assignee: United Technologies Corporation, Hartford, Conn.

[21] Appl. No.: 811,185

[22] Filed: Dec. 20, 1991

[51] Int. Cl.$^5$ .............................. B05D 3/02; B63H 5/06
[52] U.S. Cl. ................................ 427/397.7; 427/383.5; 428/446; 416/241 R
[58] Field of Search .................. 427/397.7, 367, 383.5; 428/446, 450, 469, 472, 472.2; 416/241 R

[56] References Cited

U.S. PATENT DOCUMENTS

| | | | |
|---|---|---|---|
| 2,656,321 | 10/1953 | Hunter et al. | 252/313 |
| 3,445,361 | 5/1969 | Sicka et al. | 204/181 |
| 3,476,691 | 11/1969 | Smith et al. | 252/313 |
| 3,678,306 | 7/1972 | Garnier et al. | 310/39.11 |
| 3,779,006 | 12/1973 | Lewis et al. | 60/39.11 |
| 3,839,618 | 10/1974 | Muehlberger | 427/34 |
| 4,099,990 | 7/1978 | Brown et al. | 148/6.35 |
| 4,117,868 | 10/1978 | Pignocco et al. | 138/146 |
| 4,145,462 | 3/1979 | Kuwabara et al. | 427/160 |
| 4,181,532 | 1/1980 | Woodhead | 106/40 R |
| 4,297,150 | 10/1981 | Foster et al. | 148/6.3 |
| 4,297,246 | 10/1981 | Cairns | 428/472 |
| 4,360,449 | 11/1982 | Oberlander et al. | 252/313 R |
| 4,371,570 | 2/1983 | Goebel et al. | 427/248.1 |
| 4,554,897 | 11/1985 | Yamada et al. | 123/188 AA |
| 4,613,454 | 9/1986 | Keiser | 252/313.2 |
| 4,681,818 | 7/1987 | Unnam et al. | 428/607 |
| 4,801,399 | 1/1989 | Clark | 252/315.6 |
| 4,810,415 | 3/1989 | Winklebauer et al. | 252/183.13 |
| 4,921,731 | 5/1990 | Clark | 427/376.3 |
| 4,942,732 | 7/1990 | Priceman | 60/261 |
| 5,009,688 | 4/1991 | Nakanishi | 65/18.3 |
| 5,013,499 | 5/1991 | Willard | 264/30 |
| 5,028,352 | 7/1991 | Hietals et al. | 252/315.6 |
| 5,045,514 | 9/1991 | Ismail et al. | 501/119 |
| 5,047,174 | 9/1991 | Sherif | 252/309 |
| 5,080,977 | 1/1992 | Zaplatynsky | 428/697 |
| 5,089,456 | 2/1992 | Maeda et al. | 501/119 |
| 5,126,087 | 6/1992 | Lespade et al. | 427/370 |
| 5,182,165 | 1/1993 | Clough et al. | 428/263 |

*Primary Examiner*—Peter A. Nelson
*Attorney, Agent, or Firm*—Herbert W. Mylius

[57] ABSTRACT

A method is taught for protecting fuel contacting surfaces of a gas turbine engine from carbon deposition by the application of a coating of alumina and silica thereto from a sol gel specifically formulated for this purpose.

27 Claims, No Drawings

INHIBITING COKE FORMATION BY COATING GAS TURBINE ELEMENTS WITH ALUMINA-SILICA SOL GEL

The invention was made under a U.S. Government contract and the Government has rights herein.

BACKGROUND OF THE INVENTION

1. Field of the Invention

This invention relates to a method for preventing the deposition of carbon, or coke, on fuel wetted surfaces located in high temperature zones of gas turbine engines. Coke deposition is an undesirable side effect caused by the catalytic-thermal degradation of hydrocarbon fuels during their consumption in gas turbine engines. Such deposition leads to performance loss, reduced heat transfer efficiencies, increased pressure drops, costly decoking procedures, and increased rates of material corrosion and erosion. The metals most prone to catalyze coke deposition are those metals commonly found in the alloys utilized in components exposed to high temperature, fuel wetted environments of gas turbine engines, typically found in jet engines in the combustor and afterburner fuel delivery systems.

2. Description of the Prior Art

Carburization, or the formation of coke deposits, has been noted particularly in high temperature environments where carbon containing fluids come in contact with metals or metal alloys. Exemplary of such environments are high temperature reactors, such as refinery crackers, thermal crackers, distillation units for petroleum feedstock, and gas turbine components. Conventional methods used to reduce coke formation and carburization in steam cracking operations involve the steam pretreatment of the surface to promote formation of a protective oxide skin. The surface may then be further protected by the deposition of a high temperature, stable, non-volatile metal oxide on the pre-oxidized substrate surface by thermal decomposition from the vapor phase of a volatile compound of the metal.

While the chemical vapor deposition of an alkoxysilane has been demonstrated to reduce the rate of coke formation in the pyrolysis section of an ethylene steam cracker by formation of an amorphous silica film on the internal surfaces of high alloy steel tubing at 700° to 800° C., no one to date has solved the problem of coke deposition on fuel contacting hardware in gas turbine engines.

Alumina coatings have been previously applied to a large number of substrates for various purposes, but not, to our knowledge, for the prevention of coke deposition on fuel contacting elements in gas turbines, prior to the teachings of U.S. patent application Ser. No. 811,359, now U.S. Pat. No. 5,264,244 and U.S. Ser. No. 811,356, now U.S. Pat. No. 5,269,137, of Edwards, filed Dec. 20, 1991, and incorporated herein by reference. For example, flame sprayed coatings of alumina have been applied to foundry molds, but lacked adherence due to thermal shock. In U.S. Pat. No. 2,903,375, Peras attempted to overcome this problem by applying layered coatings of cermets containing alumina and chromium. Montgomery et al, in U.S. Pat. No. 2,775,531, suggest the application of aluminum-alumina cermets to metal substrates by flame spraying and sintering to provide high temperature oxidation resistance and thermal insulation. In U.S. Pat. No. 3,839,618, Muehlberger teaches spray coating stainless steel with a dielectric layer of alumina. Hecht, in U.S. Pat. No. 4,034,142, teaches the protection of nickel and cobalt superalloy articles at elevated temperatures by the formation of a coating having an external continuous layer composed predominately of alumina, which reduces oxidation and corrosion.

As indicated, various processes have been used to deposit ceramic materials such as alumina upon a substrate. These include the application of glazes, enamels, and coatings; hot-pressing materials at elevated pressure and temperature; and, vapor deposition processes such as evaporation, cathodic sputtering, chemical vapor deposition, flame spraying, and plasma spraying. In addition, electrophoresis has been attempted, as have other specialized techniques, with limited success in application.

For example, the enamelling industry has used the electrodeposition of ceramic materials for some time. In the application of a ceramic coating by this technique, a ceramic material is milled or ground to a small particulate or powder size, placed into suspension, and electrophoretically deposited on the substrate. Another traditional method is the deposition of a ceramic coating from a slurry made up of a powder in suspension, usually in an aqueous medium. A major problem with these techniques is that powder particle sizes below about 2 microns were difficult to obtain, thus limiting the quality of coatings produced.

Sol-gel technology has recently evolved as a source of very fine sub-micron ceramic particles of great uniformity. Such sol-gel technology comprises essentially the preparation of ceramics by low temperature hydrolysis and peptization of metal oxide precursors in solution, rather than by the sintering of compressed powders at high temperatures.

In the prior art, much attention has been given to the preparation of sols of metal oxides (actually metal hydroxides, in most cases) by hydrolysis and peptization of the corresponding metal alkoxide, such as aluminum sec-butoxide [$Al(OC_4H_9)_3$], in water, with an acid peptizer such as hydrochloric acid, acetic acid, nitric acid, and the like. The hydrolysis of aluminum alkoxides is discussed in an article entitled "Alumina Sol Preparation from Alkoxides" by Yoldas, in American Ceramic Society Bulletin Vol. 54, No. 3 (1975), pages 289-290. This article teaches the hydrolysis of aluminum alkoxide precursor with a mole ratio of water:precursor of 100:1, followed by peptization at 90° with 0.07 moles of acid per mole of precursor. After gelling and drying, the dried gel is calcined to form alumina powder.

In U.S. Pat. No. 4,532,072, of Segal, an alumina sol is prepared by mixing cold water and aluminum alkoxide in stoichiometric ratio, allowing them to react to form a peptizable aluminum hydrate, and peptizing the hydrate with a peptizing agent in an aqueous medium to produce a sol of an aluminum compound.

In Clark et al, U.S. Pat. No. 4,801,399, a method for obtaining a metal oxide sol is taught whereby a metal alkoxide is hydrolysed in the presence of an excess of aqueous medium, and peptized in the presence of a metal salt, such as a nitrate, so as to obtain a particle size in the sol between 0.0001 micron and 10 microns.

In Clark et al, U.S. Pat. No. 4,921,731, a method is taught for ceramic coating a substrate by thermophoresis of sols of the type prepared by the method of U.S. Pat. No. 4,801,399. In addition, Clark et al, in abandoned U.S. patent application Ser. No. 06/841,089, filed Feb. 25, 1986, teach formation of ceramic coatings on a substrate, including filaments, ribbons, and wires, by electrophoresis of such sols. However, the examples of this application indicate that the coatings obtained using electrophoresis were uneven, cracked, and contained bubbles, and often peeled, flaked off, and/or pulled apart.

SUMMARY OF THE INVENTION

The present invention relates to a means for reducing coke formation on metallic substrates, such as fuel contacting components of gas turbines, particularly such as in the combustor and afterburner of a jet engine. A thermally resistant barrier layer is applied to the surface of the component to prevent contact of the fuel with catalytic agents such as iron, nickel, and chromium, contained in the base metals from which fuel contacting components are fashioned. Specifically, the fuel contacting components are coated with a thin, high temperature resistant layer of alumina and silica, applied in specific ratios, from a specially formulated sol-gel, using deposition procedures designed to minimize coating defects. The oxide mixture which is deposited reduces the rate and severity of coke deposition on the surfaces, and provides even, dense, and uniform coatings, while avoiding the costly preparatory steps of prior art techniques for ceramic deposition on a substrate. The method of the present invention may, however, be used to provide protective coatings to a wide variety of substrates.

DESCRIPTION OF THE PREFERRED EMBODIMENTS

Coke deposition has been found to be an undesirable side effect caused by the thermally accelerated degradation of hydrocarbon fuels during their use for power generation in gas turbine engines. It is a particular goal of the present invention to reduce the deposition of carbon on fuel contacting components of gas turbine engines such as fuel nozzles, fuel lines, and augmentor spray manifolds, and such other areas as lubrication systems and breather tubes.

It is known that hydrocarbon fuels may degrade either under high temperature conditions, i.e. thermally, or under lower temperature conditions in the presence of a catalytic material. One approach to the problem in the past has been to regulate the quality of the fuel consumed, so as to limit degradation thereof. However, as engines are required to run faster and hotter to achieve greater output, the ability of present day hydrocarbon fuels to provide the required performance without coking is lessened. Further, since many of the metals required for the construction of higher temperature gas turbine engines are catalytic to the degradation of hydrocarbon fuels, coke formation has become of greater concern. Accordingly, a method has been sought to increase the temperature at which engines may operate without degradation of the fuel and deposition of coke. It has now been found that this may be achieved by the application of a suitable coating to fuel contacting surfaces to act as a barrier between the hydrocarbon and the catalytic elements in the surfaces. Certain high temperature resistant materials either do not participate in the mechanism of catalytic-thermal deposition of coke, or participate to a much lesser degree than such metals as iron, nickel, chromium, or their alloys. It has also been noted in the course of our investigations that certain materials actually enhance the degradation of carbon containing fuels. These same materials, when exposed to elevated temperatures, cause any gums and/or varnishes which do form to completely burn away. A suitable coating has been found to comprise a mixture of alumina, $Al_2O_3$, and silica, $SiO_2$, which may be applied from a mixture of sol gels prepared from a variety of organo-metallic compounds, although it is also possible to utilize doped metal oxide coating components, such as chrome-ion doped alumina, yttria, and mixtures thereof, such as Yttria-Alumina-Garnet (YAG), $3Y_2O_3.5 Al_2O_3$. Further, while the present disclosure is specific to the preparation of sols which will yield coatings comprising alumina and silica, the addition of other oxides to either the alumina sol component or the silica sol component is to be considered within the scope of this invention. The ratio of alumina to silica may be widely varied. It has been found that effective coatings may be achieved using alumina to silica ratios of from about 10:1 to about 1:10, with a preferred range of from about 2 alumina to 1 silica to about 1 alumina to 2 silica. However, the most preferred ratio of alumina to silica appears to be from about 1.5:1 to about 1:1.5. Also, while the specification speaks in terms of preparing sols of alumina and silica, it is intended that this terminology encompass those known sols of mixtures of metals and compounds of metals which will yield metal oxide mixtures upon deposition and subsequent heating.

The sols utilized in the present invention may deposit coatings on a wide range of metallic substrates which are to be protected. The method of the present invention is particularly suitable for application of mixed oxide coatings to such materials as metal alloys commonly used in the fuel handling components of gas turbine engines. Such components may comprise such materials as titanium and titanium alloys, aluminum, stainless steels, and nickel base alloys such as Inconel and Waspaloy. In addition, the method of the present invention is also suitable for protection of surfaces of copper, zirconium, tantalum, chromium, cobalt, nickel, molybdenum, tungsten, rhenium, niobium, iron, and alloys thereof. Exemplary nonmetallic substrate materials include carbon, glass, silicon carbide, silicon nitride, alumina, various ceramics, and cermets.

The process of the present invention comprises a method for providing dense, highly adherent coatings on such surfaces. We have found that this may be achieved by the use of a process which differs from the prior art in that the alumina and silica components of the sol are prepared independently, in very specific proportions and order of addition. It has been found that if the components are mixed in any order other than as set forth hereinafter, a sol suitable for the deposition of mixed oxide coatings is not obtained. It is to be noted that the silica sol component has a relatively short shelf life, requiring that it be mixed with the alumina sol within a short period of time after preparation, up to about five days. However, once the alumina and silica sol components have been mixed, the shelf life of the coating mixture is quite long, e.g. three months or longer.

Preparation of the Sol

The sol utilized in the present invention is set forth in U.S. patent application Ser. No. 811,341 and Ser. No. 811,344, of Wright, filed Dec. 20, 1991, and incorporated herein by reference. The basic procedure comprises:

a. Preparing an alumina sol by combining, in specific ratios and order of addition, water, an aluminum organo-metallic compound, peptizer, and a vaporizable carrier, at specific temperatures and within specific time frames;

b. Preparing a silica sol by combining, in specific ratios and order of addition, water, alcohol, and a silicon organo-metallic compound, under specified conditions; and c. Combining the alumina sol and the silica sol in specified ratios to obtain an alumina-silica sol having the desired composition and properties.

In general, the alumina sol component of the mixed sol utilized in the present invention may be prepared by the hydrolysis and peptization of the corresponding organo-metallic compounds in an aqueous medium. Preferred organo-metallic compounds are aluminum alkoxides, and particularly the aluminum sec-butoxides, ethoxides, and methoxides. The silica sol components may be prepared from the corresponding silanes, such as tetramethoxysilane, tetrapropyloxysilane, and tetraethoxysilane.

The aqueous medium utilized in the preparation of the sols comprises a solution of water, preferably deionized or distilled, and an organic solvent, such as an organic alcohol, aldehyde, or ketone. Suitable organic solvents include ethyl alcohol, methyl alcohol, isopropanol, butanol, and acetone. The organic solvent corresponding to the organo-component of the silane should be used in each instance for the preparation of the silica sol.

The peptizers utilized may be selected from monovalent acids, such as hydrochloric, nitric, acetic, and formic acids, or inorganic acid forming salts such as aluminum nitrate. It is envisioned that the use of a basic peptizer rather than an acidic peptizer may also be successful.

The hydrolysis, alcoholization, and peptizing procedure may be conducted at temperatures of from about 175° to about 210° F., preferably from about 190° to about 210° F., and most preferably at about 208° F., for the alumina sol. The silica sol may, in most instances, be prepared at ambient temperatures. The length of time for the reactions may be varied in accordance with the reaction temperatures and proportions of the components present in the hydrolysis/alcoholization/peptization mixture. Preferred times for the reaction and peptization are from a matter of seconds to weeks, but preferably between one minute and one week, and more preferably between 10 minutes and 24 hours.

The alcohol may be selected from methanol, ethanol, isopropanol, butanol, etc. Some surface charge effect variation is noted with variance of the alcohol used. In the preparation of aluminum hydrate sols, 2-butanol is the preferred alcohol. In the preparation of the silica sol, ethyl alcohol is preferred, and in the mixture of the sols, methanol is preferred.

The specific ratios of water, alcohol, and organo-metallic compound to be used in preparation of the alumina and silica sols may be determined by one of ordinary skill in preparation of sols so as to prepare sols having the desired chemistry and particle size.

A mixed oxide sol may be prepared in the following manner, with particular attention being given to prevention of exposure of the reaction mixture to air.

EXAMPLE 1

For the preparation of an alumina sol, a 4000 ml glass reaction vessel was assembled with a variable temperature heating mantel, a glass/teflon stirring rod with a laboratory mixer having variable speed control, an injection port with a teflon tube for insertion of liquids to the bottom of the reaction vessel, and a water-cooled pyrex condenser. After turning on the flow of cooling water to the condenser, 2500 grams (corresponding to 138.8 moles or 2500 ml) of deionized water was metered into the closed reaction vessel, after which the heating mantel was turned on to raise the temperature of the water to between 190° F. and 210° F., which temperature was thereafter maintained. The mixer motor was turned on when the water had reached this temperature, and the water was vigorously stirred. In a separately sealable glass transfer container 345.7 grams (corresponding to 1.4 moles or 357.5 ml) of aluminum sec-butoxide [$Al(OC_4H_9)_3$] was mixed with 288.86 grams (corresponding to 3.897 moles or 357.5 ml) of 2-butanol. Experience has taught that exposure of this mixture, or the aluminum sec-butoxide, to air for any longer than the absolute minimum necessary adversely affects the sol produced, so great care was exercised to avoid exposure. The mixture of sec-butoxide and 2-butanol, in the transfer container, was connected to the reaction vessel entry port after the water had reached the desired temperature, and very slowly, over a 5 minute period, metered directly down into the hot deionized water. When all of the mixture had been introduced into the water, the entry port was valved shut and the transfer container removed. The mixture of water, sec-butoxide, and 2-butanol was then permitted to hydrolyse and reflux for a period of 1 hour at temperature while stirring vigorously.

After 1 hour, and with the mixture still at temperature and being refluxed and stirred vigorously, the sol mixture was peptized by connecting a glass syringe containing 8.18 grams (0.224 moles or 6.875 ml) of hydrochloric acid to the vessel entry port. The entry valve was opened and the acid metered directly down into the sol mixture. The valve was then closed, and the syringe removed and refilled with air. The syringe was then reconnected to the entry port, and the air injected into the vessel to ensure that all of the acid had been introduced into the system. The valve was then closed, and the syringe removed.

The heating, stirring, and refluxing were maintained until the sol cleared, about 16 hours. The heat was then turned off and the stirrer and motor assembly removed. After the mixture cooled, the sol and alcohol separated, and the alcohol was removed by pipette. It was found that leaving a small amount of alcohol in the sol did not adversely affect the sol. The Ph of the sol was measured and found to be pH 3.90. This initial sol, comprising aluminum hydrate, was found to have a good shelf life, and could be stored prior to further processing. In the preparation of the alumina sol one may use from about 50 to about 400 moles of water, in combination with from about 1.0 to about 2.0 moles of aluminum organo-metallic compound, and from about 0.1 to about 0.5 moles of peptizer, and a vaporizable organic solvent. Preferably, one may use from about 100 to about 200 moles of water, from about 1.2 to about 1.6 moles of aluminum organo-metallic compound, and from about 0.2 to about 0.3 moles of peptizer. In the most preferred embodiment, as set forth by this example, one may use about 139 moles of water, 1.4 moles of aluminum organo-metallic compound, and about 0.22 moles of peptizer.

The silica component of the sol was separately prepared by mixing, in a clean pyrex beaker, under a ventilated hood, 308.00 ml ethyl alcohol, and 18.00 ml deionized water. The mixture was vigorously shaken and stirred until well mixed. A aliquot of 55.57 ml tetraethoxysilane was then added to the mixture, and allowed to sit for at least five minutes after mixing. This mixture has a short shelf life before gelling, and is believed to comprise a sol of $SiO_2$ per se. In the preparation of the silica sol, one may use from about 0.5 to about 2 moles of water, from about 3 to about 10 moles of alcohol, and from about 0.1 to about 0.5 moles of silicon organo-metallic compound. Preferably, one may use from about 0.8 to about 1.2 moles of water, from about 4.8 to about 5.5 moles of alcohol, and from about 0.2 to about 0.3 moles of silicon organo-metallic compound. In the most preferred embodiment, as set forth by this example, one may use about 1 mole of water, about 5.27 moles of alcohol, and about 0.25 moles of silicon organo-metallic compound.

In a separate pyrex beaker, 114.68 ml of methyl alcohol and 6.45 ml of the above prepared silica sol were mixed well. To this mixture, 25.30 ml of the above prepared alumina hydrate sol was added, and the total mixture was well mixed, yielding a mixed alumina-silica sol having a long shelf life, suitable for deposit upon fuel contacting elements for inhibiting coke deposition thereupon. In the final mixture of the alumina and silica components, one may use from about 50 to about 500 moles of alcohol per mole of metal oxide forming material, preferably from 100 to 250 moles of alcohol per mole of metal oxide forming material, and most preferably from about 175 to 200 moles of alcohol per mole of metal oxide forming material. The alumina and silica sols should be combined so as to obtain a ratio of alumina to silica in the final coating composition of from about 10:1 to about 1:10, preferably from about 2:1 to about 1:2.

A number of primary factors were identified which relate to the deposition of hydrocarbons in gas turbines. These include fuel composition, temperature, time, the availability of oxygen, and the presence of catalytic materials in the surface of the fuel handling components. For an operating gas turbine, each of these factors has an almost infinite number of possible values, with the exception of the composition of the fuel contacting elements of the gas turbine engine itself. Accordingly, the present invention is particularly suitable for control of the surface composition of the fuel handling components of the gas turbine engine, and specifically to the provision of mixed oxide coatings thereupon to reduce the deposition of carbon, or coking, or alternatively, to enhance the burnoff of coke as it is deposited.

Alloys used in hydrocarbon fuel burning engines commonly contain metals which catalyze coke deposition, such as iron, nickel, and chromium. Thermal degradation occurs as a matter of course, and there are periods during the operation of turbine engines when fuel flow is very low, or as in the case of military engine augmenter plumbing, i.e. fuel feed tubes and spray manifolds, there is no fuel flow at all. During such periods, the temperature of the residual fuel left in the plumbing can rise, causing increased coke deposition from accelerated fuel degradation reactions and thermal cracking. The contributions of various metallic hardware surfaces to coke deposition were evaluated with a goal of determining the best method for reducing the formation and adherence of coke. It has been learned that coking may be reduced by application of a surface layer of an anti-coking material to the surfaces of the fuel handling components of a gas turbine engine. Such anti-coking materials may be of a nature to either reduce or inhibit the tendency of coke to adhere to the surface, or, conversely, to enhance the catalysis of the surface and increase the reactivity such that any gums and varnishes which tend to form are caused to react further, breaking them down to gaseous products which are eliminated.

Surfaces which may be coated for prevention of coking include fuel lines, fuel nozzles, augmentor spray manifolds and other hydrocarbon contacting surfaces of gas turbines, such as lubrication systems and breather tubes. Such surfaces may comprise such materials as titanium and titanium alloys, aluminum, stainless steels, and nickel base alloys such as Inconel and Waspaloy. In addition, the present invention may be suitable for prevention of coking on other surfaces, such as copper, zirconium, tantalum, chromium, cobalt, and iron, for example. While the examples which follow relate to coating components fashioned of Waspaloy or Inconel alloys, it is to be understood that the present invention is not to be limited thereto.

EXAMPLE 2

Special liquid/vapor phase reactors were constructed to enable evaluation of several candidate surface treatments for their fuel deposit buildup tendencies. The reactors were designed so that the coking variables, i.e. temperature, time, fuel composition, oxygen availability, and plumbing material, could be controlled and varied to simulate conditions as desired.

The reactor comprised a Pyrex glass test tube closely fitted within a stainless steel tube with Swagelok® stainless steel end caps. A two way valve permitted introduction of desired atmospheres and pressure, through a drilled and back welded twelve inch length of stainless steel tubing. The top reactor fitting permitted disassembly of the reactor for cleaning and loading of new test materials. A two way valve was used to control flow of fuel and atmosphere. The Pyrex glass tube was utilized to minimize contact of the fuel and its vapor with the metallic reactor walls, ensuring that results were representative of coking on the test washers only. The test washers were hung in the vapor space of the reactor from a type 316 stainless steel tube, bent to suspend and keep separated a blank or untreated Waspaloy washer and the washer being tested. In this way, any slight variations during the coking test would be negated, since both the control and test washers would be affected equally. Test temperatures were controlled by placing the reactors in a heated aluminum block, controlled at plus or minus 2° F. of the desired temperature. Test washers were ⅜ inch diameter, with a ¼ inch hole in the center. Test washers were treated as set forth below, and were tested against untreated, or "blank" washers to determine effectiveness of the treatments applied.

Test washers were coated with mixed alumina-silica sol gels by a procedure comprising dipping the washer in the sol and air drying, for four applications of sol. Two sets of dipping and drying were performed, with a five hour firing at 1112° F. conducted between the sets. Two different sol gels were applied to independent test washers for evaluation. The first sol gel, designated AP5, comprised 60.5 parts methyl alcohol, 30.3 parts silica sol, and 9.1 parts aluminum sec-butoxide sol. The second sol, designated AP7, comprised 78.3 parts methyl alcohol, 4.4 parts silica sol, and 17.3 parts aluminum sec-butoxide sol.

The amount of fuel chosen for use in the tests and the size of the reactors were based upon the estimated residual fuel left in an augmenter spray manifold of a military aircraft engine augmenter after shutdown, and the spray manifold total internal volume. The Number 3 spray manifold was chosen since it was known to have the most severe coking problem for the specific engine being simulated. The residual fuel volume to vapor space volume was estimated to be 1:7.5. Accordingly, the fuel volume used in these tests was 10 ml, and the reactor vapor space volume was about 75 ml, to simulate actual engine conditions.

In order to approximate the cycling of an augmentor, the time at temperature for the reactors was cycled. Three 1.5 hour cycles were used. At the end of each cycle, the reactors were weighed, rapidly cooled in water, depressurized, repressurized with 30 psig air, and replaced in the heated block. After the third cycle, the reactors were opened and the test washers were dried at 230° F. for 15 minutes. The washers were then weighed to determine the percentage increase or decrease relative to the blank Waspaloy washer.

The tests were conducted at 550° F., and air pressure of 30 psig. Air pressures above this caused auto-ignition of the fuel, evidenced by copious sooting within the reactors, at 550° F. and above. Pressures below this value produced incrementally lower deposit weights, so to obtain measurable deposit weights within a reasonable time, the 30 psig pressure was selected. The test fuel used was JP-4, taken from a single two gallon sample stored at room temperature.

In addition to measuring coke deposition on the test washers, a second test was conducted to determine whether the treatment applied to the washer possessed the ability to reduce the temperature of carbon burnoff relative to Waspaloy. For this test, the burnoff temperature and the amount of deposited carbon were determined by use of a LECO Model RC412 Multiphase Carbon Determinator. An air combustion atmosphere was used rather than oxygen, to simulate actual flying conditions. Test results are as set forth in TABLE I, below. Since the LECO carbon analysis confirmed the gravimetric results, only the LECO carbon result is given for percent change in coking.

TABLE I

| CARBON DEPOSITION AND BURNOFF | | |
|---|---|---|
| Surface | Change | Burnoff Temp. |
| Waspaloy, uncoated | — | 930° F. |
| AP5 Alumina-silica | −14% | 925° F. |
| AP7 Alumina-silica | −19% | 940° F. |

These results confirm that protective surface coatings of mixed oxides may be applied to fuel contacting elements to either inhibit carbon deposition and coking, or to enhance the burnoff of such coke as is deposited.

EXAMPLE 3

To further evaluate the effectiveness of the experimental coatings in reducing the tendency of jet fuel to form coke deposits on a metal substrate, a Waspaloy augmentor spray manifold from a military jet engine was coated, and then utilized under operational conditions to be anticipated in a high performance military aircraft engine. In a typical military flight scenario, fuel is heated as it travels through the fuel plumbing on its way to the combustor and/or augmenter of the engine to be burned. Generally, the fuel flow rate is sufficiently high to limit the effect of those factors which relate to coking. However, during flight, when the augmentor is shut off, spray manifold temperatures in the afterburner section rise considerably, going from about 350° F. to about 1000° F. or higher in some areas. Fuel left in the spray manifold in these areas boils, and with no place to flow, degrades rapidly to form insoluble, sticky, gum-like varnishes, which after a number of cycles results in formation of coke deposits. A similar scenario occurs in the engine combustor fuel nozzles at engine shutdown. However, since the augmenter is cycled on and off much more frequently than the engine is, it is to be expected that the augmenter fuel plumbing would have a higher coking rate than the combustor fuel nozzles.

Deposition of the Sol

Care must be taken in the coating procedure to assure a complete coverage of the substrate, a uniform thickness of alumina and silica, and purity of the coating as applied. Appropriate cleaning steps, pretreatments, and post-treatments as are known in the art may be utilized to achieve a uniform, dense, and impervious coating. The alumina-silica coating may be applied in a thickness of from about 0.00005 inches to about 0.001 inches, most preferably from about 0.00012 to about 0.00016 inches, and may be applied as a number of thinner layers. Such a coating is stable in hydrocarbon fuels, and is thermally stable at temperatures from about minus 200° F. to about 2000° F. The coating may have a homogeneous composition and density, or have a controlled composition with a density gradient from the outermost surface to the portion in contact with the turbine element. Subcoats or bond coats may be applied if necessary to achieve an adherent bonding to the substrate, such as an oxide layer.

It is to be understood that when coating larger surfaces with alumina-silica (or other mixed oxide) sols as set forth in the present invention, it is important to remove the water from the coating as quickly as possible after deposition. Deposition may be accomplished by spray, brush application, infiltration, dipping, or preferably by immersion-evaporation techniques. The preferred thickness of the coating should be from about 0.00010 inches to about 0.00020 inches.

By using dip coating procedure wherein the augmenter spray manifold was suspended above a dip tank of sol prepared in accordance with Example 1, and permitted to rotate so as to sequentially apply coating material to the rotating surface areas of the spray manifold, the sol was applied evenly to both internal and external sections of the manifold. The rate of rotation was slow enough to permit wetting of all surfaces to be coated, and as the wetted sections were rotated out of the bath, they were subjected to heating to a temperature of from about 250° F. to about 350° F., preferably from about 275° F. to 300° F., to immediately evaporate volatile liquid components of the coating. This heating step was accomplished by use of properly spaced heating lamps, and a secondary heat source, although other heating methods may be utilized, such as passage through an area of discharge of heated inert gas, such as argon. This heating step quickly "sets" the coating, providing a continuous "green" or uncured coating, in from about 10 to about 30 minutes, without permitting the wet coating material to run or redistribute on the manifold as it rotates. The "green" coating was then cured by heating with a secondary heat source to temperatures of from about 1200° F. to about 1500° F. for about 30 minutes. By controlling the rotational speed of the manifold, the applied coating was initially set, then fully cured, prior to re-entry of the coated area of the manifold into the bath. The manifold was rotated through sufficient complete rotations to achieve a uniform coating of alumina-silica having a thickness of about 0.00015 inches. In a preferred application technique, the alumina-silica sol may be applied to the interior portions of a manifold by immersion-evaporation, wherein a measured portion of the sol is poured into the interior of the spray manifold, which is then rotated under heat until all of the liquid is transformed into a green coating, which may then be further heated to cure to an oxide layer of the desired thickness.

This manifold was then tested in an operational jet engine for 2460 Accelerated Mission Test Tactical Air Cycles, the time duration of each cycle being about 45 minutes. No coke was found inside the manifold after removal from the engine, as confirmed by neutron ray photography and visual inspection. This was extraordinary in that in normal use the specific augmenter spray manifold tested would be removed from a military engine after 1600 Tactical Air Cycles, due to coking. Thus, the test unit ran 53.8 percent longer, and exhibited essentially no coke deposition.

It is to be understood that the above description of the present invention is subject to considerable modification, change, and adaptation by those skilled in the art to which it pertains, and that such modifications, changes, and adaptations are to be considered within the scope of the present invention, which is set forth by the appended claims.

What is claimed is:

1. A method for applying an adherent mixed oxide layer to the surface of an element, said method comprising depositing a sol on said element, drying said sol to form a green coating, and heating said coating to cure said coating, said sol having been prepared by:
    a. Preparing an alumina sol by combining from about 50 to about 400 moles of water, from about 1.0 to about 2.0 moles of aluminum organo-metallic compound, from about 0.1 to about 0.5 moles of peptizer, and a vaporizable carrier, at a temperature of from about 175° to about 210° F., for sufficient time to form a clear sol;
    b. Preparing a silica sol by combining from about 0.5 to about 2.0 moles of water, from about 3 to about 10 moles of alcohol, and from about 0.1 to about 0.5 moles of a silicon organo-metallic compound, for sufficient time to form a clear sol; and
    c. Combining the alumina sol and the silica sol to obtain an alumina-silica sol having a ratio of alumina to silica of from about 10:1 to about 1:10.

2. The method of claim 1, wherein said element comprises a material selected from the group consisting of titanium, titanium alloys, aluminum, stainless steel, and nickel base superalloys.

3. The method of claim 2, wherein the ratio of alumina to silica is about 3:2.

4. The method of claim 3, wherein said layer is from about 0.00005 inches to about 0.001 inches in thickness.

5. The method of claim 4, wherein said layer is from about 0.0001 inches to about 0.0002 inches in thickness.

6. The method of claim 4, comprising heating the element after deposition of the sol thereupon to evaporate volatile liquids, and to set the sol to a green coating, by heating to a temperature of from about 250° F. to about 350° F.

7. The method of claim 6, further comprising heating the element having said green coating to a temperature of from about 1200° F. to about 1500° F. to completely cure said coating.

8. A method for applying an adherent mixed oxide layer to the surface of an element, said method comprising depositing a sol on said element, drying said sol to form a green coating, and heating said coating to cure said coating, said sol having been prepared by:
    a. Preparing an alumina sol by combining from about 100 to about 200 moles of water, from about 1.2 to about 1.6 moles of aluminum organo-metallic compound, from about 0.2 to about 0.3 moles of peptizer, and a vaporizable carrier, at a temperature of from about 190° to about 210° F., for sufficient time to form a clear sol;
    b. Preparing a silica sol by combining from about 0.8 to about 1.2 moles of water, from about 4.8 to about 5.5 moles of alcohol, and from about 0.2 to about 0.3 moles of a silicon organo-metallic compound, for sufficient time to form a clear sol; and
    c. Combining the alumina sol and the silica sol to obtain an alumina-silica sol having a ratio of alumina to silica of from about 2:1 to about 1:2.

9. The method of claim 8, wherein said element comprises a material selected from the group consisting of titanium, titanium alloys, aluminum, stainless steel, and nickel base superalloys.

10. The method of claim 9, wherein the ratio of alumina to silica is about 3:2.

11. The method of claim 10, wherein said layer is from about 0.0001 inches to about 0.0002 inches in thickness.

12. The method of claim 11, wherein said layer of alumina is from about 0.00012 inches to about 0.00016 inches in thickness.

13. The method of claim 11, comprising heating the element after deposition of the sol thereupon to evaporate volatile liquids, and to set the sol to a green coating, by heating to a temperature of from about 275° F. to about 300° F.

14. The method of claim 13, further comprising heating the element having said green coating to a temperature of from about 1200° F. to about 1500° F. to completely cure said coating.

15. A method for applying an adherent mixed oxide layer to the surface of an element, said method comprising depositing a sol on said element, drying said sol to form a green coating, and heating said coating to cure said coating, said sol having been prepared by:
    a. Preparing an alumina sol by combining about 139 moles of water, about 1.4 moles of aluminum organo-metallic compound, about 0.22 moles of peptizer, and a vaporizable carrier, at a temperature of about 208° F., for sufficient time to form a clear sol;
    b. Preparing a silica sol by combining about 1.0 moles of water, about 5.27 moles of alcohol, and about 0.25 moles of a silicon organo-metallic compound, for sufficient time to form a clear sol; and
    c. Combining the alumina sol and the silica sol to obtain an alumina-silica sol having a ratio of alumina to silica of from about 1.5:1 to about 1:1.5.

16. The method of claim 15, wherein said element comprises a material selected from the group consisting of titanium, titanium alloys, aluminum, stainless steel, and nickel base superalloys.

17. The method of claim 16, wherein the ratio of alumina to silica is about 3:2.

18. The method of claim 17, wherein said layer is from about 0.0001 inches to about 0.0002 inches in thickness.

19. The method of claim 18, wherein said layer is from about 0.00012 inches to about 0.00016 inches in thickness.

20. The method of claim 18, comprising heating the element after deposition of the sol thereupon to evaporate volatile liquids, and to set the sol to a green coating, by heating to a temperature of from about 275° F. to about 300° F.

21. The method of claim 20, further comprising heating the element having said green coating to a temperature of from about 1200° F. to about 1500° F.

22. A method for reducing carbon deposition on high temperature alloys, said method comprising applying to said alloys a coke-inhibiting layer of alumina and silica by depositing a sol, comprising alumina and silica in a molar ratio of from about 5:1 to about 1:5, upon the surface of said alloy and heating said alloy to a temperature of from about 250° F. to about 350° F. to set said sol to a green coating, and further heating said alloy to a temperature of from about 1200° F. to about 1500° F. to cure said coating.

23. The method of claim 22, wherein said alloys are selected from the group consisting of titanium, titanium alloys, aluminum, stainless steel, and nickel base superalloys.

24. The method of claim 23, wherein said layer is from about 0.00005 inches to about 0.001 inches in thickness.

25. The method of claim 24 wherein said layer is from about 0.00012 inches to about 0.00016 inches in thickness.

26. A method for the protection of a gas turbine element from coking, comprising applying to the surface of said element a layer of alumina and silica by deposition from a sol, said layer being from about 0.0001 inches to about 0.0002 inches in thickness, the molar ratio of alumina to silica being from about 5:1 to about 1:5, wherein said layer is applied by deposition from a sol into which the element is dipped, and said element is heated upon removal from said sol to evaporate all volatile liquids, thereby forming a green coating, and subsequently curing said green coating.

27. The method of claim 26, wherein said element comprises a material selected from the group consisting of titanium, titanium alloys, aluminum, stainless steel, and nickel base superalloys.

* * * * *